United States Patent
Tsirkin

(10) Patent No.: US 10,846,361 B2
(45) Date of Patent: Nov. 24, 2020

(54) USER-SPECIFIC CUSTOMIZATION OF WEB PAGES

(75) Inventor: Michael S. Tsirkin, Yokneam (IL)

(73) Assignee: Red Hat Israel, Ltd., Raanana (IL)

( * ) Notice: Subject to any disclaimer, the term of this patent is extended or adjusted under 35 U.S.C. 154(b) by 1119 days.

(21) Appl. No.: 12/968,054

(22) Filed: Dec. 14, 2010

(65) Prior Publication Data
US 2012/0151313 A1    Jun. 14, 2012

(51) Int. Cl.
*G06F 16/958* (2019.01)
*G06F 16/93* (2019.01)

(52) U.S. Cl.
CPC ............ *G06F 16/972* (2019.01); *G06F 16/94* (2019.01); *G06F 16/958* (2019.01)

(58) Field of Classification Search
CPC ......... G06F 17/30867; G06F 17/30887; G06F 17/2235; G06F 17/2247; G06F 17/30876; G06F 16/986; G06F 16/972; G06F 16/94; G06F 16/958
USPC ................................................ 715/206, 208
See application file for complete search history.

(56) References Cited

U.S. PATENT DOCUMENTS

| | | | | |
|---|---|---|---|---|
| 6,085,242 A * | 7/2000 | Chandra | ........................ | 709/223 |
| 6,128,663 A * | 10/2000 | Thomas | .................. | G06Q 30/02 709/217 |
| 6,412,008 B1 * | 6/2002 | Fields et al. | ................... | 709/228 |
| 6,615,247 B1 * | 9/2003 | Murphy | .................. | G06Q 30/02 709/217 |
| 6,799,214 B1 * | 9/2004 | Li | ..................... | H04L 29/12066 709/226 |
| 7,346,668 B2 * | 3/2008 | Willis | ............... | G06F 17/30867 707/999.003 |
| 7,467,349 B1 * | 12/2008 | Bryar | ................ | G06F 17/30905 715/200 |
| 7,594,189 B1 * | 9/2009 | Walker | ................... | G06Q 30/02 715/811 |
| 8,027,883 B2 * | 9/2011 | Donaldson | ............. | G06Q 30/00 705/26.43 |
| 8,150,824 B2 * | 4/2012 | Marmaros | ............. | G06F 16/957 707/706 |
| 8,413,042 B2 * | 4/2013 | Holt | ....................... | G06Q 30/02 715/208 |
| 8,495,485 B2 * | 7/2013 | Rundle | ............... | G06F 16/9566 715/206 |
| 9,618,343 B2 * | 4/2017 | Kahn | ..................... | G01C 21/00 |
| 9,996,627 B2 * | 6/2018 | Martinez | ........... | G06F 17/30876 |
| 10,114,805 B1 * | 10/2018 | Root | ....................... | G06F 40/14 |

(Continued)

OTHER PUBLICATIONS

Sullivan, Danny. "VigLink: Fire & Forget Solution to Turn Outbound Links Into Affiliate Earners", Jan. 12, 2010, Search Engine Land. <https://searchengineland.com/viglink-fire-forget-solution-to-turn-outbound-links-into-affiliate-earners-33315> (Year: 2010).*

*Primary Examiner* — Kavita Padmanabhan
*Assistant Examiner* — Tyler Schallhorn
(74) *Attorney, Agent, or Firm* — Lowenstein Sandler LLP

(57) ABSTRACT

A first server hosting a referring web page receives a client request for the referring web page, and provides the referring web page and referring page data associated with one or more destination web pages referenced in the referring web page to a client, where the referring page data being provided to the client for forwarding to a second server that hosts one of the destination web pages.

22 Claims, 5 Drawing Sheets

(56) References Cited

U.S. PATENT DOCUMENTS

| | | | |
|---|---|---|---|
| 2002/0075302 A1* | 6/2002 | Simchik | G06F 17/30905 715/745 |
| 2004/0199584 A1* | 10/2004 | Kirshenbaum | G06F 17/30905 709/205 |
| 2005/0076097 A1* | 4/2005 | Sullivan et al. | 709/218 |
| 2005/0149576 A1* | 7/2005 | Marmaros | G06F 16/9558 |
| 2005/0204276 A1* | 9/2005 | Hosea | G06F 17/30905 715/205 |
| 2007/0168465 A1* | 7/2007 | Toppenberg | G06Q 30/02 709/218 |
| 2008/0222736 A1* | 9/2008 | Boodaei et al. | 726/27 |
| 2008/0244038 A1* | 10/2008 | Martinez | G06F 17/30876 709/218 |
| 2009/0024467 A1* | 1/2009 | Fontoura et al. | 705/14 |
| 2009/0063491 A1 | 3/2009 | Barclay et al. | |
| 2009/0094137 A1* | 4/2009 | Toppenberg | G06Q 30/02 705/26.1 |
| 2009/0132481 A1* | 5/2009 | Toub | G06F 16/958 |
| 2009/0327863 A1* | 12/2009 | Holt et al. | 715/234 |
| 2010/0058160 A1* | 3/2010 | Navarro | G06Q 10/0637 715/208 |
| 2010/0161378 A1* | 6/2010 | Josifovski et al. | 705/10 |
| 2011/0035267 A1* | 2/2011 | Donaldson | G06Q 30/00 705/14.16 |
| 2011/0208850 A1* | 8/2011 | Sheleheda | G06F 21/6263 709/223 |
| 2012/0005572 A1* | 1/2012 | Rundle | G06F 16/9566 715/235 |
| 2013/0305136 A1* | 11/2013 | Kim | G06F 17/30876 715/234 |
| 2013/0305159 A1* | 11/2013 | Kim | G06F 17/30876 715/738 |
| 2016/0253701 A1* | 9/2016 | Navarro | G06Q 10/0637 705/14.46 |

\* cited by examiner

USER-SPECIFIC CUSTOMIZATION OF WEB PAGES

TECHNICAL FIELD

Embodiments of the present invention relate to web pages. Specifically, embodiments of the invention relate to a method and system for user-specific customization of web pages.

BACKGROUND

Many web pages are capable of displaying information pertaining to multiple subjects. Therefore, it is difficult to determine which subject is of interest to a particular user that is visiting the web page. Many web pages feature search functions in which a user can enter a relevant keyword and get results related to their subject of interest. However, this requires an extra interaction with the user and is not always an effective means for displaying the particular content the user is interested in.

BRIEF DESCRIPTION OF THE DRAWINGS

Embodiments of the present invention are illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of a method and system for user-specific customization of web pages are described herein. In one embodiment, a referring server identifies a user request to access a referring web page that contains references to one or more destination web pages. The referring server sends to a client device referring page data for the destination web pages. The referring page data may be the same data for all destination web pages or it may include different data for each destination web page. Subsequently, the client device receives a user request to access one of the destination web pages referenced in the referring web page, determines what data should be forwarded, and forwards the determined data to a destination server that hosts the destination web page along with a request to access the destination web page. The destination server modifies the destination web page based on the data associated with the referring web page and sends a modified destination web page to the client device, where it is presented to the user.

A server hosting a destination web page is therefore able to modify the destination web page to display content that is of interest to a particular user based on a referring web page. Further, the server is able to modify the destination web page without user interaction and without having to communicate with a referring server to obtain the referring web page.

Figure 1:
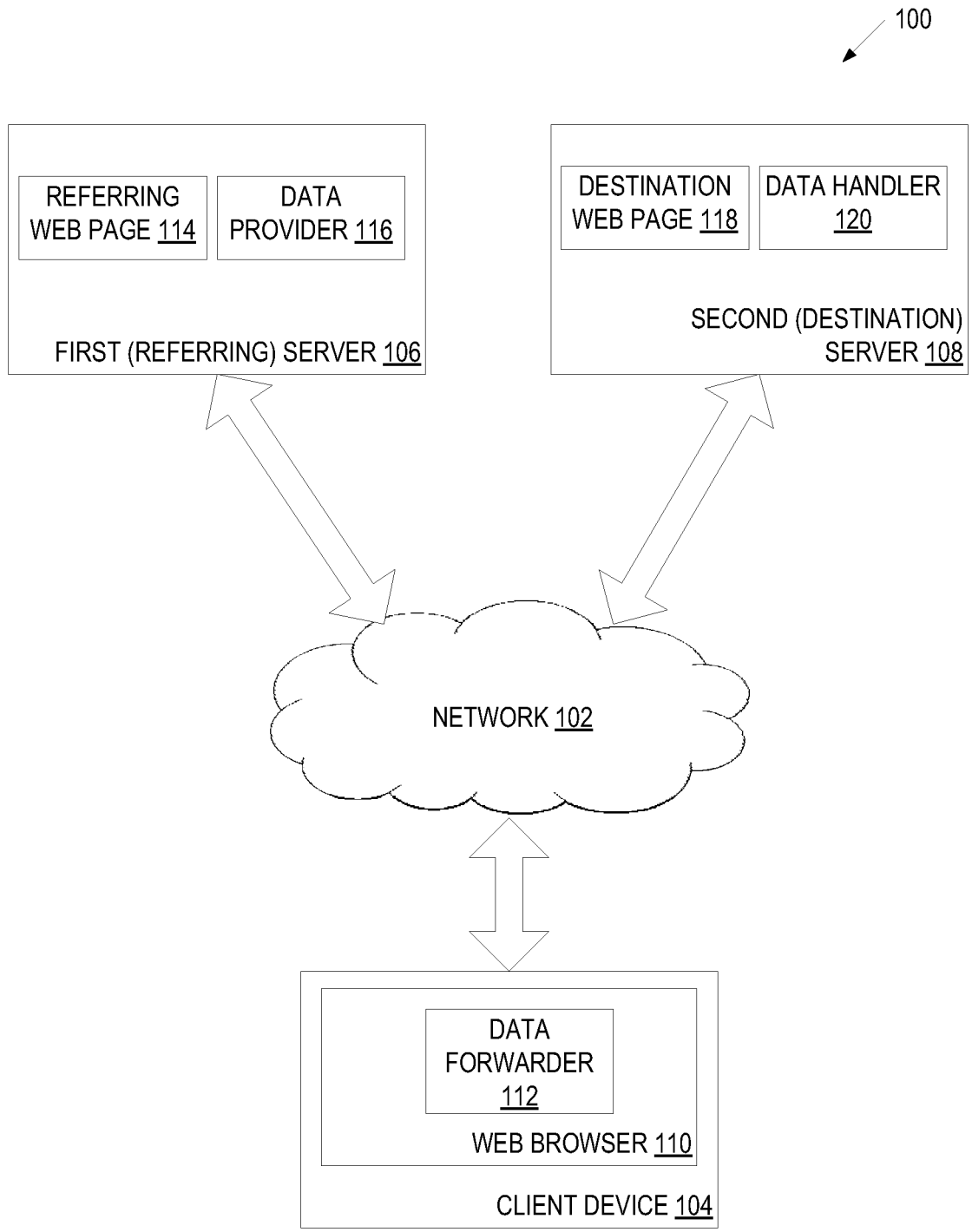
FIG. 1 illustrates an exemplary network architecture in which embodiments of the invention may operate.

FIG. 1 illustrates an exemplary network architecture 100 in which embodiments of the invention may operate. The architecture 100 includes a first server 106, a second server 108 and a client device 104 coupled via a network 102 (e.g., public network such as the Internet or private network such as a local area network (LAN)). The client device 104 may be a client computing system such as a personal computer, a laptop, a PDA, a mobile phone, a network appliance, etc. The first server 106 and the second server 108 may reside on the same or different machines (e.g., a server computer system, a gateway, a personal computer, etc.). They may run on one Local Area Network (LAN) and may be incorporated into the same physical or logical system, or different physical or logical systems.

The first server 106 and the second server 108 host various web pages, and provide specific web pages to different client devices (including client device 104) in response to content requests of the client devices. In particular, in response to a content request of the client device 104, the first server 106 may provide a web page 114 to the client device 104. The web page 114 may include a reference to a web page 118 that is hosted by the second server 108. The user of the client device 104 views the web page 114, and then sends a request for content included in the web page 118 that is referenced in the web page 114. In this context, the first server 106 acts as a referring server, the second server 108 acts as a destination server, and the web pages 114 and 118 can be referred to as a referring web page and a destination web page respectively. If the web page 114 includes references to other web pages, in addition to the web page 118 hosted by the second server 108, these other references can also be referred as destination web pages, and the servers hosting these destination web pages can be referred to as destination server(s).

In one embodiment, the referring server 106 hosts a data provider 116, the destination server 108 hosts a data handler 120, and the client device 104 hosts a data forwarder 112 that may be part of a web browser 110 or another application communicating with the web browser 110. Browser 110 requests a desired web page from a server that hosts the web page (e.g., referring server 106 or destination server 108) over the network 102, and presents the web page to the user for viewing.

In one embodiment, a user accesses referring web page 114 from referring server 106 using browser 110. Data provider 116 may identify references to one or more destination web pages in the referring web page 114, and send referring page data associated with the destination web pages to the client device 104. In one embodiment, the data provider 116 sends the referring page data to the client device 104 when providing the referring web page 114 to the client device 104. In another embodiment, the data provider 116 sends the referring page data to the client device 104 upon identifying a user request to access a destination web page 118 (when the user activates a corresponding link while viewing the referring web page 114). In yet another embodiment, the data provider 116 sends the referring page data to the client device 104 upon receiving a prefetch request from the client device 104 (i.e., after sending the referring web page 114 to the client device 104 but before identifying the user request to access the destination web page). Web page data may describe the referring web page (e.g., a list of keywords describing the referring web page, a topic of the destination web page that is relevant to the referring web page or other descriptive text, etc.), or it may be all or part of the contents of the web page.

In one embodiment, each web page has a data forwarding property that specifies whether the server hosting the referring web page should provide referring web page data for destination web page(s) referenced in the referring web page. The data forwarding property may be set automatically or it may be based on user input. For example, a user may enable data forwarding for some pages hosted by a server but not for others (e.g., because of security concerns). In another embodiment, data forwarding for a particular web page may be enabled only if the destination web page meets certain criteria. For instance, data forwarding may only be enabled if the destination web page is part of a certain web site (e.g. content forwarding may only be enabled internally within a certain web site or domain), if the destination web page is of a certain type (e.g., an online store), if the destination web page has a certain degree of trustworthiness, etc.

The data provider 116 may determine whether data forwarding is enabled for the referring web page before sending the web page data to the client device. In one embodiment, the data to be forwarded and the data forwarding property for the page may be described in an element (e.g., an HTML element) in the referring web page. For example, forwarding of descriptive text may be enabled by specifying <meta name="forward" content="link text">. The element may be a meta tag placed in the header of a web page that provides metadata (e.g., whether content forwarding is enabled) about the web page. If the data to be forwarded is a list of keywords describing the page, the keywords may be included in the meta tag. Alternatively, if the data to be forwarded is a descriptive text, the descriptive text may be included in the referring page (e.g., clicking a link <A HREF="http://redhat.com ">Fedora Linux</A> will forward the text "Fedora Linux" together with a request for a web page at http://redhat.com).

In some embodiments, the data that is to be forwarded may not be the same for all web pages hosted by a server. For example, a home page of a publicly-accessible web site may allow the entire contents of the page to be forwarded, while a different publicly-accessible web page of the web site may allow only a list of describing key words to be forwarded and a third, private, password-protected page may not allow any information to be forwarded.

In one example, if the referring web page 114 is part of a web site about computer security and specifically refers to Linux® security, it may have the following meta tags:
 <meta name="keywords" content="linux, security"><meta name="forward" content="page"> indicating that the keywords that describe the content of the page are "linux" and "security" and that the data that is to be forwarded is the whole page ("page"). Alternatively, the data to be forwarded may be set to "keywords" (only keywords are forwarded), "none" (no data is forwarded), etc.

In one embodiment, the referring page data is the same for all destination web pages referenced in the referring web page. In another embodiment, the referring page data is different for different destination web pages. For example, different parts of the referring web page may be relevant for different destination web pages, and the referring page data may include different information (e.g., different keywords, descriptive text, web page content portions) to reflect these differences. In another example, different referring page data may correspond to different types of the destination web pages.

In an alternative embodiment, data forwarder 112 of client device 104 receives the referring page data associated with the referring web page 114 and decides what data should be forwarded to destination server 108 depending on a destination web page and the referring page data. In one embodiment, the data to be forwarded is the same for all destination web pages referenced in the referring web page 114. In another embodiment, the data to be forwarded is different for different destination web pages. For example, different parts of the referring web page may be relevant for different destination web pages, and the data to be forwarded may include different information (e.g., different keywords, descriptive text, web page content portions) to reflect these differences. In another example, different data to be forwarded may correspond to different types of the destination web pages.

Data forwarder 112 may decide what data should be forwarded to destination server 108 upon receiving a user request to access the destination web page 118. Data forwarder 112 then forwards this data to the destination server 108 along with a request for the destination web page 118. In one embodiment, the data forwarder 112 receives the referring page data along with the referring web page 114. In another embodiment, the data forwarder 112 receives the referring page data upon identifying a user request to access the destination web page (when the user activates a corresponding link while viewing the referring web page 114). In yet another embodiment, the data forwarder 112 receives the referring page data upon sending a prefetch request to the referring server 106 (i.e., after receiving the referring web page 114 from the referring server 106 but before identifying the user request to access the destination web page). In one embodiment, data forwarder 112 will only forward the received data if the user has selected an option on the client 104 to allow data forwarder 112 to forward received web page data to destination servers.

In one embodiment, data handler 120 of destination server 108 receives the data associated with the referring web page and uses it to modify the destination web page 110 before returning the destination page to the client device 104. In so doing, the destination web page 110 can emphasize content of particular interest to the user rather than general content that the user may not be interested in. Furthermore, data handler 120 is able to customize the destination web page without querying referring server 106 for the contents of referring web page 114.

In one embodiment, data handler 120 modifies the destination web page 118 by highlighting keywords. Alternatively, data handler 120 may identify which content in destination web page 110 would be of greatest interest to the user based on the received data (e.g., by scanning the destination page for the presence of keywords) and rearrange the content of destination web page 118 in order to more prominently feature the content of greatest interest. In another embodiment, data handler 120 may filter the contents of the destination web page using keywords and only keep the content that is deemed to be of interest to the user.

In one embodiment, if the received data is a descriptive text or all or part of the contents of the referring web page 114 rather than a list of keywords, data handler 120 analyzes the received data and creates a list of keywords that describe referring web page 114 before modifying the destination web page based on those keywords.

In one example, if the destination web page is an online bookstore and the data it has received is in the form of the keywords "security" and "linux," data handler 120 may filter the content of the destination web page to only include books about Linux security, to display books about Linux security more prominently than other books, etc.

Once the destination web page is modified, destination server 108 may provide the modified version of the destination web page to the client device 104. Upon receiving a modified version of the destination web page, web browser 110 may present it to the user for viewing. In some embodiments, web browser 110 may also present the keywords used in generating the modified version of the destination web page to the user so that the user can see why a modified version is presented instead of a default version.

In some circumstances, a user may want to visit the destination web page again at a later time and see the modified version that is currently displayed (e.g., the user will expect that if they create a bookmark to the destination site, accessing the bookmark at a later time will bring up the same version of the page as they are currently viewing). However, the URL of the destination web site will not be sufficient to allow a user to return to the destination web page, since the web page was modified based on additional information (the data associated with the referring web page). In some embodiments, the data handler 120 generates a hyperlink that includes the data associated with the referring web page that was used to generate the modified destination web site (e.g., the URL received by the client device will identify the destination web page and include a tag that indicates what keywords were used to modify the destination web page). When a user desires to bookmark the destination web page, the web browser 110 records the received hyperlink as the web address of the destination web page. Subsequently, when the user activates the bookmarked hyperlink, the data handler 120 modifies the destination web page using prior web page data, and provides the modified destination web page to the client device 104.

Alternatively, when a user requests to bookmark the destination web page, web browser 110 may store the data associated with the referring web page and associate it with the created bookmark. When a user desires to access the destination web page in the future using the bookmark, web browser 110 may forward the data associated with the referring web page to the destination server 108 along with a request to access the destination web page 118.

Figure 2A:
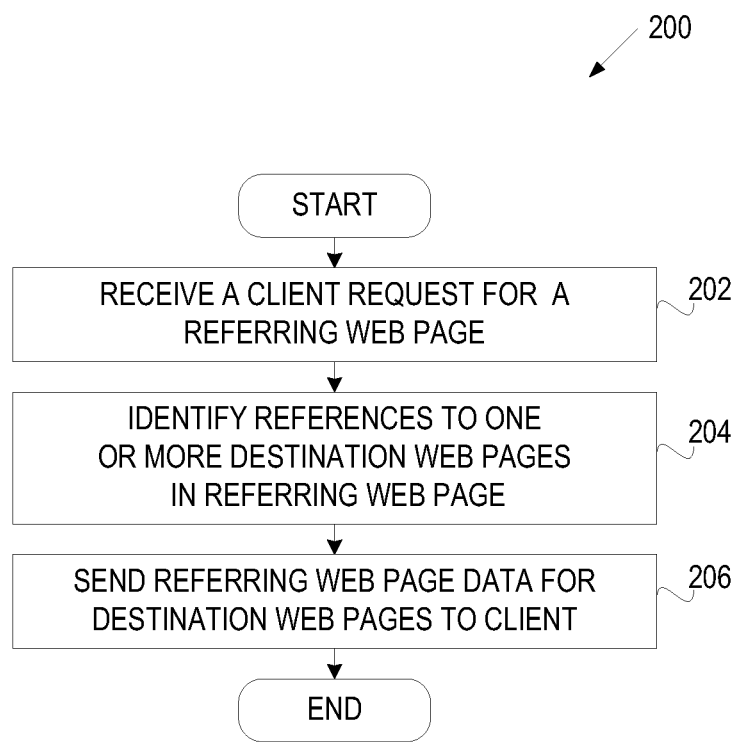
FIG. 2A is a flow diagram of one embodiment of a method for user-specific customization of web pages.

FIG. 2A is a flow diagram of one embodiment of a method 200 for user-specific customization of web pages. The method 200 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 200 is performed by a web server (e.g., referring server 106 of FIG. 1).

Referring to FIG. 2A, the referring web server receives a client request for a referring web page from the client (block 202). At block 204, the referring web server identifies references to one or more destination web pages in the referring web page. At block 206, the referring web server provides to the client the referring web page and the referring page data for the destination web pages.

In another embodiment, the referring web server only provides the referring web page but not the referring page data. While the user is viewing the referring web page, it may identify a user request for a destination web page (e.g., upon a user activation of a hyperlink on the referring web page leading to the destination web page). Then the referring web server sends to the client the referring page data for the destination web page. In yet another embodiment, the referring web server provides the referring page data to the client upon receiving a prefetch request from the client (after sending the referring web page to the client but before identifying the user request for the destination web page). The referring page data may be all or part of the contents of the referring web page, or it may be a list of keywords or a text that describes the referring web page.

In some embodiments, prior to sending the referring page data, the referring web server determines whether data forwarding is enabled for the particular web page based on a data forwarding property. Data forwarding may only be enabled for certain web pages hosted by a server. The data forwarding property may also be set to only allow forwarding to destination web pages that meet certain criteria. If the property indicates data forwarding is enabled, the referring web server may also determine what type of data is to be forwarded for the particular referring web page and/or destination web page.

In other embodiments, the referring web server sends the referring page data to the client without determining whether data forwarding is enabled and/or without determining what type of data should be forwarded to a destination web server. Instead, the client makes the above determination(s) prior to sending the referring page data. In particular, the client determines whether data forwarding is enabled for the particular web page based on a data forwarding property. Data forwarding may only be enabled for certain web pages hosted by a server. The data forwarding property may also be set to only allow forwarding to destination web pages that meet certain criteria. If the property indicates data forwarding is enabled, the client may also determine what type of data is to be forwarded for the particular referring web page and/or destination web page.

Figure 2B:
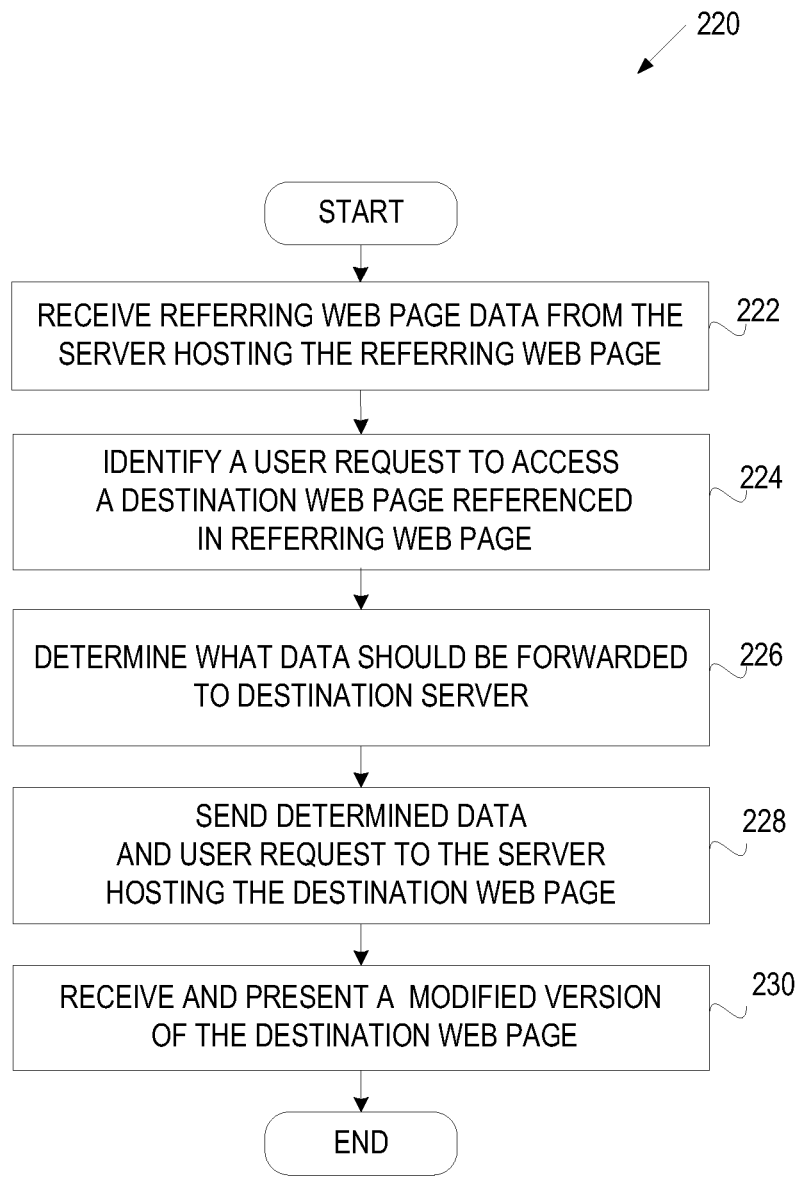
FIG. 2B is a flow diagram of another embodiment of a method for user-specific customization of web pages.

FIG. 2B is a flow diagram of another embodiment of a method 220 for user-specific customization of web pages. The method 220 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 220 is performed by a client (e.g., client device 104 of FIG. 1).

Referring to FIG. 2B, the client sends a user request to access a referring web page to a referring server and receives the referring web page from the referring server (block 222). In one embodiment, the client receives the referring web page along with referring page data associated with one or more destination web pages. In one embodiment, the client stores the referring page data in a local data store. The local data store may be a database, a file, a repository or any other data structure residing on a persistent storage unit such as a magnetic storage unit, optical storage unit, solid state storage unit or similar storage unit.

At block 224, the client identifies a user request to access a destination web page referenced in the referring web page. The user request may be identified when the user is viewing the referring web page and activates a hyperlink on the referring web page that leads to the destination web page, or when the referring web page is no longer presented to the user (e.g., when the user enters the URL of the destination web page or performs a similar action).

At block 226, the client determines what data should be forwarded to a destination server depending on the destination web page and the referring page data. In some embodiments, the above determination includes determining whether the user has allowed data to be forwarded to a destination server. At block 228, the client sends the data identified at block 226 and the user request to access the destination web page to the destination server.

In another embodiment, the client receives the referring web page but not the referring page data from the referring server. While the user is viewing the referring web page, the client may identify the user request for the destination web page, and forward a request for referring page data to the referring server. Upon receiving the referring page data for the destination web page, the client may determine what data should be forwarded to the destination server and forward the request for the destination web page along with the determined data to the destination server.

In yet another embodiment, the client receives the referring web page from the referring server and sends a prefetch request for the referring page data associated with destination web pages to the referring server (after receiving the referring web page but before identifying a user request for a destination web page). Upon receiving the referring page data associated with destination web pages, the client stores the referring page data in a local data store (e.g., in a temporary buffer or a persistent data store). Further, in response to a user request to access a destination web page, the client determines what data should be forwarded to the destination server and forwards the request for the destination web page along with the determined data to the destination server.

At block 228, the client receives and presents a modified version of the destination web page. In some embodiments, the client may also present a list of keywords used to modify the destination web page to the user. If the user requests to create a bookmark of the destination web page, the client may store the received data with a hyperlink to the destination web page. If the user requests to access the destination web page using the created bookmark, the client may send the stored data to the destination server along with a request to access the destination web page.

Figure 2C:
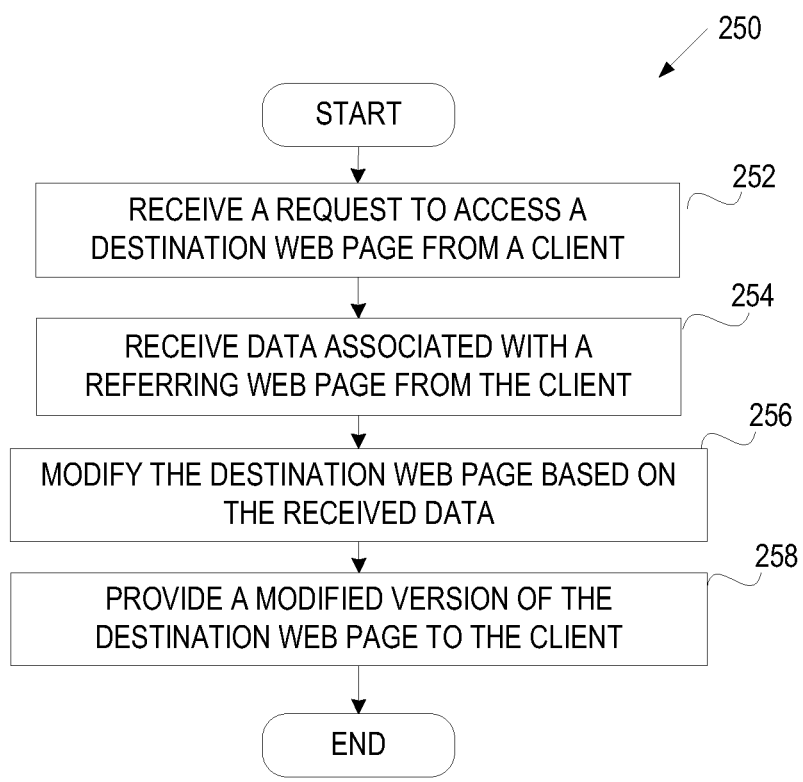
FIG. 2C is a flow diagram of yet another embodiment of a method for user-specific customization of web pages.

FIG. 2C is a flow diagram of yet another embodiment of a method 250 for user-specific customization of web pages. The method 250 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 250 is performed by a web server (e.g., destination server 108 of FIG. 1).

Referring to FIG. 2C, the destination server receives a request to access a destination web page from a client at block 252. At block 254, the destination server receives data associated with a referring web page from the client. In some embodiments, the data associated with the referring web page is sent along with the request for access by the client.

The destination server modifies the destination web page based on the received data at block 256. In some embodiments, if the received data is all or part of the contents of the referring web page, the destination server analyzes the received data and obtains a list of keywords that describe the referring web page. Alternatively, the received content may include a list of keywords describing the referring web page.

In some embodiments, the destination server modifies the destination web page by highlighting keywords. Alternatively, the destination server may identify which content in the destination web page would be of greatest interest to the user based on the received data (e.g., by scanning the contents for the presence of keywords) and rearrange the content of the destination web page to more prominently feature the content of greatest interest. In another embodiment, the destination server may filter the contents of the destination web page using keywords and only keep the content that is deemed of interest to the user.

At block 258, the destination server provides a modified version of the destination web page to the client. In some embodiments, the destination server also provides a hyperlink that identifies the destination web page (e.g., via a URL) and includes the data associated with the referring web page to enable the client to access the same modified version of the destination web page at a later time by accessing the provided hyperlink.

Figure 3:
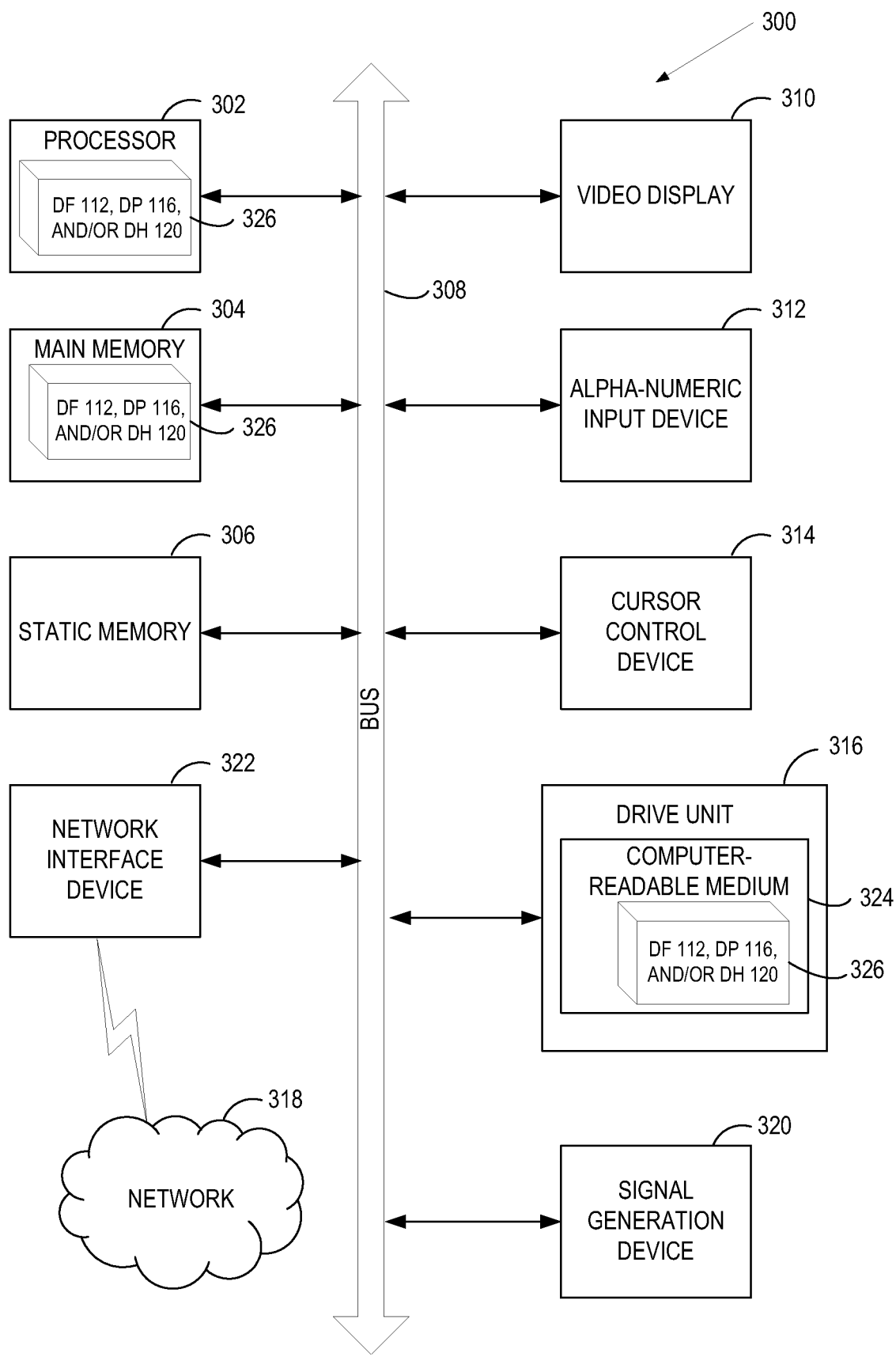
FIG. 3 is a block diagram of a system for user-specific customization of web pages, according to some embodiments of the present invention.

FIG. 3 is a block diagram of one embodiment of a computer system 300 for user-specific customization of web pages, according to some embodiments of the present invention. Within the computer system 300 is a set of instructions for causing the machine to perform any one or more of the methodologies for user-specific customization of web pages discussed herein. In alternative embodiments, the machine may be connected (e.g., networked) to other machines in a LAN, an intranet, an extranet, or the Internet. The machine can operate in the capacity of a server machine or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies for user-specific customization of web pages discussed herein.

The exemplary computer system 300 includes one or more processing devices 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a drive unit 316 (e.g., a data storage device, which may include fixed or removable computer-readable storage medium), which communicate with each other via a bus 308.

:Processing devices 302 represent one or more general-purpose processing devices such as a microprocessor, central processing unit, or the like. More particularly, the processing device 302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. Processing device 302 is configured to execute instructions of a data forwarder (DF) 112, data provider (DP) 116, and/or data handler (DH) 120 for performing the operations and steps for user-specific customization of web pages discussed herein.

The computer system 300 may further include a network interface device 322 (e.g., NIC, Ethernet network card, etc.). The computer system 300 also may include a video display unit 310 (e.g., a liquid crystal display (LCD) or a cathode ray tube (CRT)) connected to the computer system through a graphics port and graphics chipset, an alphanumeric input device 312 (e.g., a keyboard), a cursor control device 314 (e.g., a mouse), and a signal generation device 320 (e.g., a speaker).

The secondary memory 316 may include a machine-readable storage medium (or more specifically a computer-readable storage medium) 324 on which is stored one or more sets of instructions of a data forwarder (DF) 112, data provider (DP) 116, and/or data handler (DH) 120 embodying any one or more of the methodologies or functions for user-specific customization of web pages described herein. The data forwarder (DF) 112, data provider (DP) 116, and/or data handler (DH) 120 may also reside, completely or at least partially, within the main memory 404 and/or within the processing device 302 during execution thereof by the computer system 300, the main memory 304 and the processing device 302 also constituting machine-readable storage media. The instructions of a data forwarder (DF) 112, data provider (DP) 116, and/or data handler (DH) 120 may further be transmitted or received over a network 318 via the network device 322.

The computer-readable storage medium 324 may also be used to store the instructions of a data forwarder (DF) 112, data provider (DP) 116, and/or data handler (DH) 120 persistently. While the computer-readable storage medium 324 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies for user-specific customization of web pages of the present invention. The term "computer-readable storage medium" shall accordingly be taken to include, but not be limited to, solid-state memories, and optical and magnetic media.

The components and other features for user-specific customization of web pages described herein (for example in relation to FIG. 1) can be implemented as discrete hardware components or integrated in the functionality of hardware components such as ASICS, FPGAs, DSPs or similar devices. In addition, these components can be implemented as firmware or functional circuitry within hardware devices. Further, these components can be implemented in any combination of hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "modifying," "identifying," "causing," "providing," "forwarding" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations for user-specific customization of web pages. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for user-specific customization of web pages has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, by a first server device, a client request for a referring web page, wherein the referring web page comprises a header with a meta tag comprising i) a data forwarding property that indicates that data forwarding is enabled for destination web pages in the referring web page that meet a criteria, ii) first referring page data for a first destination web page in the referring web page, the first destination web page having a first arrangement of content, and iii) second referring page data for a second destination web page in the referring web page, wherein the first referring page data comprises first descriptive text to be forwarded with a first request for the first destination web page, responsive to a selection of a first link in the referring web page, the first request and the first descriptive text cause a second server device that hosts the first destination web page to rearrange the content on the first destination web page into a second arrangement of the content by prioritizing a presentation of the first descriptive text over other content at the first destination web page such that the first descriptive text is more prominently featured in the second arrangement as compared to the first arrangement, wherein the second referring page data comprises second descriptive text to be forwarded with a second request for the second destination web page, responsive to a selection of a second link in the referring web page, wherein the first referring page data is different than the second referring page data;

sending, by the first server device, the referring web page to a client device;

determining that the first destination web page meets the criteria indicated in the data forwarding property; and providing, to the client device by the first server device, the first referring page data in response to the first destination web page meeting the criteria, wherein the first referring page data being provided to the client device causes the client device to forward the first referring page data, including the first descriptive text, with the first request for the first destination web page to the second server device that hosts the first destination web page to rearrange the content on the first destination web page into the second arrangement of the content.

2. The method of claim 1, wherein the first descriptive text comprises at least one of: a list of keywords, text that describes a topic of the first destination web page relevant to the referring web page, or at least part of the actual content of the referring web page.

3. The method of claim 1, further comprising:
upon receiving the client request for the referring web page, identifying the first link to the first destination web page and the second link to the second destination web page in the referring web page; and
upon receiving the client request for the referring web page, creating a response for the client device, the response including the first referring page data including the first descriptive text to be forwarded with the first request for the first destination web page; and
receiving, by the first server device, a selection of the first link in the referring web page, wherein the providing the first referring page data comprises providing the first referring page data in response to the selection of the first link in the referring web page.

4. The method of claim 1, further comprising:
after sending the referring web page to the client device, identifying a user request to access the first destination web page while the referring web page is presented to a user wherein the providing the first referring page data comprises providing the first referring page data in response to the identifying the user request.

5. The method of claim 1, further comprising:
after sending the referring web page to the client device, receiving a client request for the first referring page data associated with the first destination web page wherein the providing the first referring page data comprises providing the first referring page data in response to receiving the client request.

6. The method of claim 1, wherein the data forwarding property is specified by a user or corresponds to a website domain that comprises the first destination web page, and wherein the meta tag in the referring web page corresponds to a Hypertext Markup Language (HTML) element.

7. The method of claim 1, further comprising:
receiving, by the first server device, a second selection of the second link in the referring web page, the second destination web page having a third arrangement of content, wherein the second request and the second descriptive text cause a third server device that hosts the second destination web page to rearrange the content on the second destination web page into a fourth arrangement of the content by prioritizing a presentation of the second descriptive text over other content at the second destination web page such that the second descriptive text is more prominently featured in the fourth arrangement as compared to the third arrangement;
determining that the second destination web page meets the criteria indicated in the data forwarding property; and
providing, to the client device by the first server device, the second referring page data in response to the second destination web page meeting the criteria, wherein the second referring page data being provided to the client device causes the client device to forward the second referring page data, including the second descriptive text, with the second request for the second destination web page to the third server device that hosts the second destination web page to rearrange the content on the second destination web page into the fourth arrangement of the content.

8. The method of claim 1, further comprising:
receiving, by the first server device, a second selection of the second link in the referring web page;
determining that the second destination web page does not meet the criteria indicated in the data forwarding property; and
providing, to the client device by the first server device, the referring web page only in response to the second destination web page not meeting the criteria.

9. A method comprising:
sending, by a client device executing a browser application to a first server device, a request for a referring web page, wherein the referring web page comprises a header with a meta tag comprising i) a data forwarding property that indicates that data forwarding is enabled for destination web pages in the referring web page that meet a criteria, ii) first referring page data for a first destination web page in the referring web page, the first referring page data identifying a portion of the referring web page to be forwarded, the first destination web page having a first arrangement of content, and iii) second referring page data for a second destination web page in the referring web page, wherein the first referring page data comprises first descriptive text to be forwarded with a first request for the first destination web page, responsive to a selection of a first link in the referring web page, the first request and the first descriptive text cause a second server device that hosts the first destination web page to rearrange the content on the first destination web page into a second arrangement of the content by prioritizing a presentation of the first descriptive text over other content at the first destination web page such that the first descriptive text is more prominently featured in the second arrangement as compared to the first arrangement, wherein the second referring page data comprises second descriptive text to be forwarded with a second request for the second destination web page, responsive to a selection of a second link in the referring web page, wherein the first referring page data is different than the second referring page data;

receiving, by the client device from the first server device, the referring web page;

sending, by the client device to the first server device, a selection of the first link in the referring web page;

receiving, by the client device from the first server device, the header with the meta tag;

determining, by the client device, that the header identifies the portion of the referring web page that is to be forwarded in response to the selection of the first link in the referring web page, and wherein the data forwarding property indicates that data forwarding is enabled for the portion of the referring web page;

determining, by the client device, that the first destination web page meets the criteria indicated in the data forwarding property;

sending, by the client device, the first referring page data with the first request for the first destination web page and the first descriptive text to the second server device that hosts the first destination web page in response to the selection of the first link in the referring web page and in view the first destination web page meeting the criteria, wherein sending the first referring page data with the first request for the first destination web page and the first descriptive text causes the second server device to rearrange the content on the first destination web page into the second arrangement of the content; and receiving, by the client device, the first destination web page from the second server device, the first destination web page having been rearranged in the second arrangement by the second server device.

10. The method of claim 9 wherein the referring web page is received from the first server device together with the first referring page data and the second referring page data.

11. The method of claim 9 further comprising:
presenting the referring web page to a user;
identifying a user request to access the first destination web page;
sending a request for the first referring page data to the first server device; and
receiving the first referring page data from the first server device.

12. The method of claim 9 further comprising:
after receiving the referring web page from the first server device, sending a request for the first referring page data to the first server device; and
receiving the first referring page data from the first server device.

13. The method of claim 9, further comprising:
determining whether to forward the first referring page data to the second server device by determining whether a user has selected an option to allow the first referring page data to be forwarded as part of the criteria.

14. The method of claim 9, further comprising:
presenting, by the client device, the first referring page data to a user along with the first destination web page.

15. The method of claim 9, further comprising:
in response to a user request to create a bookmark for the first destination web page, storing the first referring page data associated with the referring web page along with a hyperlink to the first destination web page.

16. The method of claim 9, further comprising:
sending by the client device to the first server device, a second selection of the second link in the referring web page, the second destination web page having a third arrangement of content;
determining, by the client device, that the second destination web page meets the criteria indicated in the data forwarding property;
sending, by the client device, the second referring page data with the second request for the second destination web page and the second descriptive text to a third server device that hosts the second destination web page in response to the selection of the second link in the referring web page and in view the second destination web page meeting the criteria, wherein sending the second referring page data with the second request for the second destination web page and the second descriptive text causes the second server device to rearrange the content on the second destination web page into a fourth arrangement of the content by prioritizing a presentation of the second descriptive text over other content at the second destination web page such that the second descriptive text is more prominently featured in the fourth arrangement as compared to the third arrangement; and
receiving, by the client device, the second destination web page from the third server device, the second destination web page having been rearranged in the fourth arrangement by the third server device.

17. The method of claim 9, further comprising:
receiving, by the first server device, a second selection of the second link in the referring web page;
determining that the second destination web page does not meet the criteria indicated in the data forwarding property; and
providing, to the client device by the first server device, the referring web page only in response to the second destination web page not meeting the criteria.

18. A system comprising:
a memory;
a processing device, operatively coupled with the memory, to:
receive a client request for a referring web page, wherein the referring web page comprises a header with a meta tag comprising i) a data forwarding property that indicates that data forwarding is enabled for destination web pages in the referring web page that meet a criteria, ii) first referring page data for a first destination web page in the referring web page, the first destination web page having a first arrangement of content, and iii) second referring page data for a second destination web page in the referring web page, wherein the first referring page data comprises first descriptive text to be forwarded with a first request for the first destination web page, responsive to a selection of a first link in the referring web page, the first request and the first descriptive text cause a second server device that hosts the first destination web page to rearrange the content on the first destination web page into a second arrangement of the content by prioritizing a presentation of the first descriptive text over other content at the first destination web page such that the first descriptive text is more prominently featured in the second arrangement as compared to the first arrangement, wherein the second referring page data comprises second descriptive text to be forwarded with a second request for the second destination web page, responsive to a selection of a second link in the referring web page, wherein the first referring page data is different than the second referring page data;

send the referring web page to a client device;

determine that the first destination web page meets the criteria indicated in the data forwarding property; and provide, to the client device the first referring page data in response to the first destination web page meeting the criteria, wherein the first referring page data being provided to the client device causes the client device to forward the first referring page data, including the first descriptive text, with the first request for the first destination web page to the second server device that hosts the first destination web page to rearrange the content on the first destination web page into the second arrangement of the content.

19. The system of claim 18, wherein the first descriptive text comprises at least one of: a list of keywords, text that describes a topic of the first destination web page relevant to the referring web page, or at least part of the actual content of the referring web page.

20. The system of claim 18, wherein the processing device is further to:

upon receiving the client request for the referring web page, identify the first link to the first destination web page and the second link to the second destination web page in the referring web page; and upon receiving the client request for the referring web page, create a response for the client device, the response including the first referring page data, including the first descriptive text, to be forwarded with the first request for the first destination web page;

receive a selection of the first link in the referring web page; and provide the first referring page data in response to the selection of the first link in the referring web page.

21. A non-transitory computer readable medium comprising instructions that, when executed by a client device, cause the client device to:

send a request for a referring web page to a first server device, wherein the referring web page comprises a header with a meta tag comprising i) a data forwarding property that indicates that data forwarding is enabled for destination web pages in the referring web page that meet a criteria, ii) first referring page data for a first destination web page in the referring web page, the first referring page data identifying a portion of the referring web page to be forwarded, the first destination web page having a first arrangement of content, and iii) second referring page data for a second destination web page in the referring web page, wherein the first referring page data comprises first descriptive text to be forwarded with a first request for the first destination web page, responsive to a selection of a first link in the referring web page, the first request and the first descriptive text cause a second server device that hosts the first destination web page to rearrange the content on the first destination web page into a second arrangement of the content by prioritizing a presentation of the first descriptive text over other content at the first destination web page such that the first descriptive text is more prominently featured in the second arrangement as compared to the first arrangement, wherein the second referring page data comprises second descriptive text to be forwarded with a second request for the second destination web page, responsive to a selection of a second link in the referring web page, wherein the first referring page data is different than the second referring page data;

receive from the first server device the referring web page;

send a selection of the first link in the referring web page to the first server device;

determine that the header identifies the portion of the referring web page that is to be forwarded in response to the selection of the first link in the referring web page, and wherein the data forwarding property indicates that data forwarding is enabled for the portion of the referring web page;

determine that the first destination web page meets the criteria indicated in the data forwarding property;

send the first referring page data with the first request for the first destination web page and the first descriptive text to the second server device that hosts the first destination web page in response to the selection of the first link in the referring web page and in view the first destination web page meeting the criteria, wherein the first referring page data being sent to the second server device with the first request for the first destination web page and the first descriptive text causes the second server device to rearrange the content on the first destination web page into the second arrangement of the content; and receive the first destination web page from the second server device, the first destination web page having been rearranged in the second arrangement by the second server device.

22. The non-transitory computer readable medium of claim 21, wherein the client device is to:

present the referring web page to a user; and identify a user request to access the first destination web page.

* * * * *